(12) United States Patent
Shu et al.

(10) Patent No.: US 7,062,289 B2
(45) Date of Patent: Jun. 13, 2006

(54) METHOD AND APPARATUS OF MULTI-CARRIER POWER CONTROL OF BASE STATION IN BROAD-BAND DIGITAL MOBILE COMMUNICATION SYSTEM

(75) Inventors: Yuxin Shu, Shenzhen (CN); Qingquan Peng, Shenzhen (CN); Wenlong Zheng, Shenzhen (CN)

(73) Assignee: Huawei Technologies Co., Ltd. (CH)

( * ) Notice: Subject to any disclaimer, the term of this patent is extended or adjusted under 35 U.S.C. 154(b) by 457 days.

(21) Appl. No.: 10/469,111

(22) PCT Filed: Oct. 26, 2001

(86) PCT No.: PCT/CN01/01509

§ 371 (c)(1), (2), (4) Date: Aug. 25, 2003

(87) PCT Pub. No.: WO02/071771

PCT Pub. Date: Sep. 12, 2002

(65) Prior Publication Data

US 2004/0082355 A1   Apr. 29, 2004

(30) Foreign Application Priority Data

Feb. 27, 2001 (CN) ............................ 01 1 05445
May 25, 2001 (CN) ............................ 01 1 12988

(51) Int. Cl.
  *H04B 7/00* (2006.01)
(52) U.S. Cl. .................................. 455/522; 370/318
(58) Field of Classification Search ............ 455/522, 455/69, 561, 127.1, 127.2; 370/337, 347, 370/318
See application file for complete search history.

(56) References Cited

U.S. PATENT DOCUMENTS

| | | | |
|---|---|---|---|
| 5,745,846 A | 4/1998 | Myer et al. | 455/209 |
| 6,590,906 B1 | 7/2003 | Ishida et al. | 370/480 |
| 6,694,148 B1 * | 2/2004 | Frodigh et al. | 455/522 |
| 6,701,135 B1 * | 3/2004 | Posti et al. | 455/103 |

FOREIGN PATENT DOCUMENTS

| | | |
|---|---|---|
| EP | 0 594 358 A2 | 10/1993 |
| EP | 0 735 731 A2 | 10/1996 |
| EP | 0 825 728 A2 | 2/1998 |

OTHER PUBLICATIONS

International Search Report for PCT/EP98/03968 mailed Dec. 3, 1999.

* cited by examiner

*Primary Examiner*—Nay Maung
*Assistant Examiner*—Tu Nguyen

(57) ABSTRACT

Disclosed is an open-loop power control method for base station in a broadband GSM system. The method employs an open-loop control method and implements the power control for each carrier before synthesizing multi-way digital intermediate frequencies. In this method, the dynamic power control and the slope power control are implemented individually firstly, then the multi-way synthesis is implemented, the static power control can be implemented according to the respective carrier frequencies, or it can be implemented in the common portion. The open-loop power control method for multi-carrier according to the invention allows the power control for the respective carriers to be independent of each other completely, and the transmitting power of any carrier at any time slot can be varied flexibly and easily.

12 Claims, 2 Drawing Sheets

METHOD AND APPARATUS OF MULTI-CARRIER POWER CONTROL OF BASE STATION IN BROAD-BAND DIGITAL MOBILE COMMUNICATION SYSTEM

FIELD OF THE TECHNOLOGY

The present invention relates to a multi-carrier power control apparatus for base station in a broadband digital mobile communication system and control method thereof, and it can be applied to all Time Division Multiple Address (TDMA) systems in which power control is required.

BACKGROUND OF THE INVENTION

Among all digital cellular mobile communication systems, the GSM communication system is the most developed and has the largest market occupation. It employs the digital wireless communication technology in which FDMA and TDMA are combined.

One of the effective measures for improving the system capacity of GSM communication system is to increase the utilization factor of the spectrum, specifically, is to decrease interference between channels. At present, there are three kinds of main methods for decreasing the interference: automatic power control, frequency hopping and discontinuous transmitting (DTX). Here, DTX is essentially a kind of power control method. Therefore, the power control in GSM is an important means for decreasing the multiple access interference. It not only can significantly improve the channel quality, but also can increase the system capacity to a large extent.

The principle of the automatic power control is that the transmitting power of a transmitter will be adaptively decreased under a condition that the excellent transmission quality can be obtained without the maximum transmitting power, namely, the even transmitting power of mobile stations and base stations will be reduced if it can be ensured that transmitting quality is greater than a given threshold, thereby the interference to other channels can be decreased. The power control occupies an important position in transmitting technology, specifically, the performance quality of a transmitter mainly depends on the performance of the power control. In practice, multiple terms in the wireless specification of GSM aim at the power control.

As shown in FIG. 1, a traditional narrow band GSM base station normally employs a close-loop power control method that performs single power control for each carrier. The control procedure is as follows. A positive direction power detection voltage outputted from a power amplifier is detected by a detector 105, then a subtraction is implemented in an adder 104 for the above-mentioned voltage and a template curve 106 obtained in advance according to a certain algorithm, the resultant difference is used to control an attenuator 101 in transmitting passage through an integrator 103, thereby the transmitting power is modified. If the power voltage detected at a certain time is lower than a known template voltage 106, the voltage outputted by the integrator 103 will be increased, the attenuation of the attenuator 101 will be decreased, and the output power will be increased to facilitate the increasing of the positive direction power detection voltage. In contrast, if the detected voltage is higher than the template voltage 106, the voltage outputted by the integrator 103 will be decreased, the attenuation of the attenuator 101 will be increased, and the final output power of the power amplifier will be decreased, thereby the voltage outputted by the detector will be decreased.

The power control of a broadband multi-carrier GSM system is a new subject occurring in an evolvement procedure of GSM base station from narrow band to broadband, and it is also a problem that must be solved in developing the broadband multi-carrier GSM technology. Since there is a large difference between the structure of a broadband base station and that of a traditional base station, it is difficult to apply the traditional single-carrier power control method to a broadband base station. So far, the information on the multi-carrier power control of GSM has not been found.

A multi-carrier signal is a combination of the respective single-carrier signals. Because the frequency points and powers of the respective carriers are variable and the envelope of a multi-carrier combination signal is difficult to be predicted, it is difficult to detect the power envelopes of the respective carrier frequencies with a simple and easy method. While the power envelope of each carrier can be detected in real time is a premise condition to implement the close-loop power control, therefore, a great difficulty exists in implementing the close-loop power control for multi-carrier signals.

SUMMARY OF THE INVENTION

In order to overcome the disadvantages of the traditional power control method for the base station, an object of the present invention is to provide a multi-carrier power control apparatus for the base station in a broadband digital mobile communication system and control method thereof. By using an inherent characteristic that the transmitting channel of the multi-carrier transmitter has superlinearity, this method and apparatus are capable of simultaneously performing the power control for a plurality of carriers and satisfying the requirements of the time domain template and the frequency domain template at the same time. Furthermore, the power control for the respective carriers is independent of each other, therefore, the transmitting power of any carrier at any time slot can be varied flexibly and easily.

To achieve the object of the present invention, the multi-carrier power control apparatus for base station in a broadband digital mobile communication system comprises: N digital up-conversion processors, a data processor, an adder, a digital to analog converter, a filter and a transmitter with a numerical controlled attenuator. In this apparatus, N-way baseband signals are respectively inputted to the N digital up-conversion processors, meanwhile, the power control data and the carrier frequency information are sent to the data processor and processed by the data processor, and then the dynamic power level data are respectively outputted from the data processor to N digital up-conversion processors. The data outputted from N digital up-conversion processors are transferred to the adder, the synthesized data are sent in turn to the digital to analog converter, the filter and the transmitter with a numerical controlled attenuator, meanwhile, the up-down slope control data are also outputted from the data processor to the transmitter with a numerical controlled attenuator to be transmitted by the transmitter.

In the above-mentioned apparatus, the data processor may comprise a control time sequence processor and a slope data processor. In this instance, the power control data and the carrier frequency information are sent to the control time sequence processor of the data processor, the signals are outputted from the control time sequence processor through two ways, the signals of one way are sent to N digital up-conversion processors, and the signals of the other way are sent to the slope data processor. After being processed by the slope data processor, also two ways of signals are outputted, the signals of one way are outputted respectively to N digital up-conversion processors, and the signals of the other way are outputted to the transmitter with a numerical controlled attenuator to be transmitted by the transmitter.

Preferably, each of the up-conversion processors comprises a modulator, a digital multiplier, a filter module, an interpolation filter and a numerical controlled oscillator that are connected in sequence. In this instance, the power control data and the carrier frequency information are sent to the control time sequence processor of the data processor, the signals are outputted from the control time sequence processor through two ways, the signals of one way are sent to N digital multipliers, and the signals of the other way are sent to the slope data processor, the signals processed by the slope data processor are respectively outputted to N digital multipliers.

Preferably, the apparatus further comprises N digital multipliers, wherein the input terminals of the N digital multipliers are respectively connected to the output terminals of the corresponding N digital up-conversion processors, and the output terminals are connected to the adder. In this instance, the synthesized data are transferred in turn to the digital to analog converter, the filter and the transmitter with a numerical controlled attenuator; two ways of signals are outputted from the data processor, the signals of one way are sent to N digital multipliers, and the static power control data are outputted through the other way to the numerical controlled attenuator of the transmitter.

More preferably, the data processor comprises a control time sequence processor and a slope data processor. In this instance, the power control data and the carrier frequency information are sent to the control time sequence processor of the data processor, the signals are outputted from the control time sequence processor through two ways, the signals of one way are sent to N digital multipliers, and the signals of the other way are sent to the slope data processor. After being processed by the slope data processor, also two ways of signals are outputted, the signals of one way are outputted respectively to N digital multipliers, and the static power control data are outputted through the other way to the transmitter with a numerical controlled attenuator to be transmitted by the transmitter.

The multi-carrier power control method for base station in a broadband digital mobile communication system employs an open-loop control method and implements the power control for each carrier before multi-way synthesizing. The method comprises the steps of:

(1) the data processor receiving power control data and information of respective carrier frequencies, and generating dynamic control data, static control data and corresponding up-down slope control data corresponding to the respective carrier frequencies;

(2) the data processor sending the dynamic control data and the up-down slope control data corresponding to the respective carrier frequencies to the corresponding digital frequency converter to implement the dynamic power level control and the static power control;

(3) generating a multi-way synthesized multi-carrier signal through summing the signals outputted from the digital frequency converters, and sending the multi-carrier signal to the numerical controlled attenuator after filtering and digital to analog converting; and (4) the numerical controlled attenuator implementing the power control for the filtered multi-carrier signal based on the digital to analog converted control data.

In the above-mentioned method, the slope curves of different levels for the power control of the respective carriers can be set based on the practical requirement, the method may further comprises: determining one power control slope curve firstly; calculating the power control slope curve data of the respective power levels based on different power levels; and storing the power slope data of all levels into the data processor.

In the above-mentioned method, the static power level control can be implemented in the digital domain together with the dynamic power level control and the up-down slope control, or implemented in the radio frequency domain by the numerical controlled attenuator.

Preferably, that static power level control is implemented in the digital domain together with the dynamic power level control and the up-down slope control is: the static power level data, the dynamic power level control data and the up-down slope control data are directly transferred together from the data processor to the respective digital up-converters to implement the power control.

Preferably, that static power level control is implemented in the radio frequency domain by the numerical controlled attenuator is: the static power level data are transferred from the data processor to the numerical controlled attenuator to implement the static power control in the radio frequency domain.

In the above-mentioned method, the static power control and the dynamic power control are implemented together when the dynamic range of the digital to analog converter is large enough, and the static power control is implemented in the radio frequency domain when the dynamic range of the digital to analog converter is limited.

In the above-mentioned method, the up-down slope data of the respective carriers can be multiplexed. In this instance, the method further comprises: the data processor locking the corresponding up-down slope data into the corresponding digital multipliers at proper timing by using the method of time division multiplexing based on the received respective carrier power data and the respective carrier frequency information; and simultaneously sending the multiplied data of the respective carrier to the adder to sum up through outputting an enable.

BRIEF DESCRIPTION OF THE DRAWINGS

The invention will be described in more detail hereinafter, with reference to the accompanying drawings and embodiments.

DETAILED DESCRIPTION OF THE INVENTION

Figure 1:
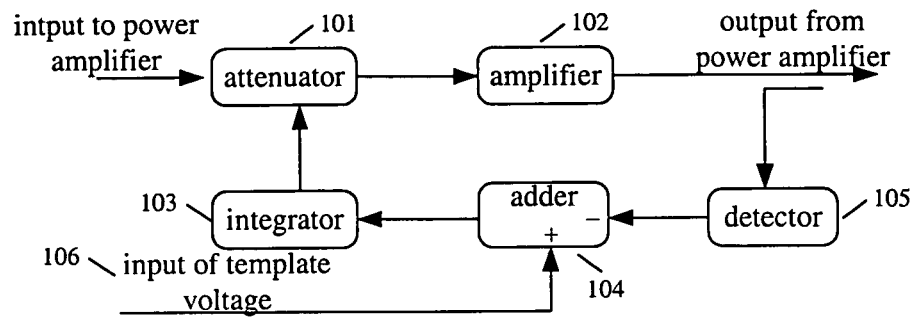
FIG. 1 is a principle block diagram for implementing the close-loop power control for base station in a single carrier GSM in prior art.

A multi-carrier power control apparatus for base station in a broadband digital mobile communication system according to the invention and control method thereof employ multi-carrier open-loop power control. The power control for the respective carriers can be implemented before synthesizing the multi-way digital intermediate frequency signals.

The method for implementing multi-carrier power control before synthesizing the multi-way digital intermediate frequency signals is to implement the dynamic power control and the slope power control for each carrier individually in advance, and then to synthesize the multi-way carriers. The static power control can be implemented not only for individual carrier frequencies respectively, but also in common portion. The idea of the power control is that the power control for each carrier is completed before multi-way synthesizing, namely, the dynamic power control and the up-down slope control are implemented firstly for each carrier, and then multi-way synthesizing is implemented. The dynamic power control and the up-down slope control can be respectively implemented not only in the digital up-conversion processors corresponding to each carrier, but also in the digital multipliers corresponding to each carrier that follow the corresponding digital up-conversion processors. When the dynamic range of DAC is large enough, the static power control is implemented together with the dynamic power control, that is, the static power control is also implemented according to the respective carrier frequencies before synthesizing the multi-way carriers. In contrast, when the dynamic range of DAC is limited, the static power control is implemented in the common channel, that is, the static power control is implemented in the radio frequency portion for the multi-way synthesized signals. The method allows a smooth transition of the slope curve during power level switching process, thereby the abrupt change possibly existing at the power level switching point can be avoided.

A method for implementing multi-carrier power control according to the invention comprises the steps of:

(1) the data processor receiving power control data and information about respective carrier frequencies, and generating dynamic control data, static control data and corresponding up-down slope control data for the respective carrier frequencies;

(2) the data processor transferring the generated dynamic control data and the up-down slope control data for the respective carrier frequencies to corresponding digital frequency converters to implement the dynamic power level control and the static power control;

(3) obtaining a multi-may synthesized multi-carrier signal through summing the signals outputted from the digital frequency converters, and transferring the multi-carrier signal to the numerical controlled attenuator after filtering and digital to analog converting; and (4) the numerical controlled attenuator performing power control for the filtered multi-carrier signal based on the digital to analog converted control data.

Figure 2:
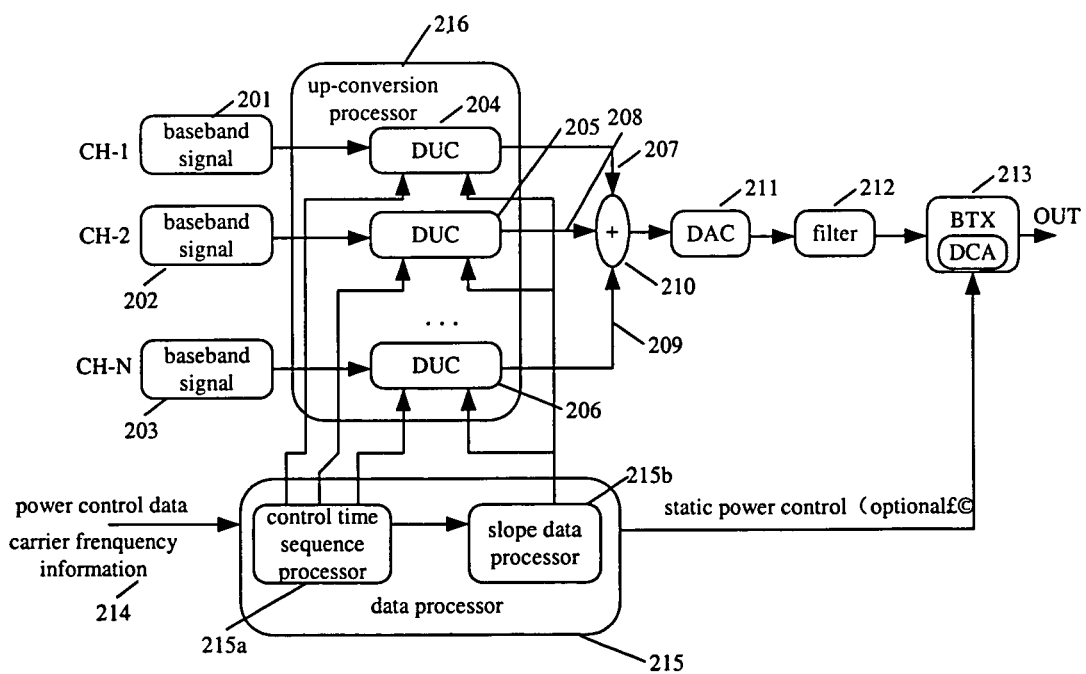
FIG. 2 is a structure schematic diagram showing the first embodiment of the multi-carrier power control apparatus according to the present invention.

Referring to FIG. 2 in which a possible multi-carrier power control apparatus is shown, a multi-carrier power control apparatus for base station in a broadband digital mobile communication system according to the embodiment comprises: N digital up-conversion processors 216, a data processor 215, an adder 210, a digital to analog converter 211, a filter 212 and a transmitter 213 with a numerical controlled attenuator. N-way baseband signals 201, 202, 203, . . . are respectively inputted to the corresponding N digital up-conversion processors 204, 205, 206, . . . . Meanwhile, the power control data and the carrier frequency information 214 are sent to the data processor 215 that comprises a control time sequence processor 215a and a slope data processor 215b. The power control data and the carrier frequency information are sent to the control time sequence processor 215a of the data processor. The signals from the control time sequence processor 215a are outputted through two ways, the signals of one way are sent to N digital up-conversion processors, and the signals of the other way are sent to the slope data processor. The signals outputted from the control time sequence processor 215a to the slope data processor 215b are processed by the slope data processor and also two ways of signals are outputted. The signals of one way are outputted to N digital up-conversion processors, respectively, and the signals of the other way are outputted to the transmitter with a numerical controlled attenuator to be transmitted by the transmitter.

Figure 3:
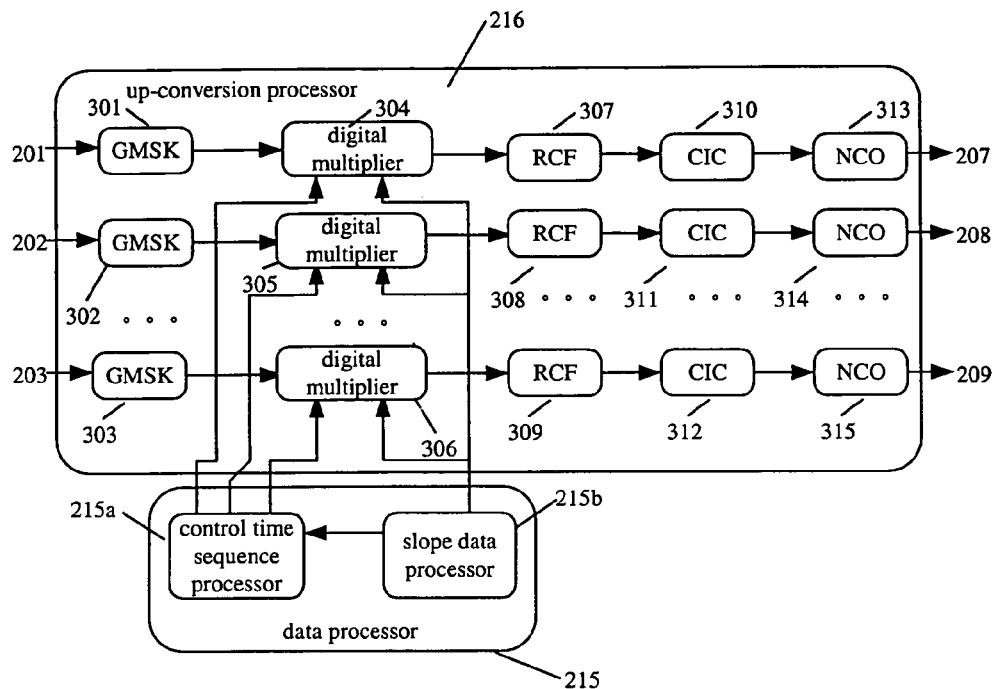
FIG. 3 is a structure schematic diagram of the digital up-conversion processor (DUC) in FIG. 2.

FIG. 3 illustrates a structure of a digital up-conversion processor used in FIG. 2. This digital up-conversion processor is dedicated and can be implemented by ASIC design.

Each digital up-conversion processor comprises a modulator 301, a digital multiplier 304, a filter module 307, an interpolation filter 310 and a numerical controlled oscillator 313 that are connected in sequence. The power control data and the carrier frequency information are transferred to the control time sequence processor 215a of the data processor. The signals outputted from the control time sequence processor are divided into two ways, the signals of one way are sent to N digital multipliers 304, 305, 306, . . . and the signals of the other way are sent to the slope data processor 215b. After processed by the slope data processor, the signals are respectively outputted to N digital multipliers 304, 305, 306, . . . .

The power control data required for respective carrier frequencies are generated by the data processor 215. The power control for the respective carrier frequencies is implemented by the multiplier modules 304, 305, 306, . . ., and the modulation, power control, filtering and digital up-conversion for the baseband signals are implemented by the digital up-conversion processors 304, 305, 306, . . . . The data processor 215 is used for receiving the information on the dynamic and static power levels of the respective carrier frequencies, generating the up-down slope power control data required for the respective carriers based on the up-down slope control curve, the dynamic power level data and the static power level data, and respectively transferring them to the corresponding digital multiplier modules 304, 305, 306, . . . . The multiplication of the respective modulation signals 301, 302, 303, . . . with the power control data is implemented by the digital multiplier modules 304, 305, 306, . . ., and the output data therefrom are processed by the filter modules (RAM Coefficient FIR Filter, RCF) 307, 308, 309, . . ., the interpolation filters (Cascade Integrator Comb FIR Filter, CIC) 310, 311, 312, . . ., and the number controlled oscillator 313, 314, 315, . . ., and then calculated by the adder module 210 to synthesize the multi-carrier power controlled data 207, 208, 209, . . . .

If the static power level control, the dynamic power level control and the up-down slope control are implemented together, total N+M (N is the number of the static power levels supported by the base station, and M is the number of the dynamic power control levels supported by the base station) up-down slope control curves are required. If the static power control is implemented by the numerical controlled attenuator 213 in the analog domain, the number of required up-down slope curves will be decreased to M.

When the invention is applied, the up-down slope data of the respective carriers can be multiplexed. Namely, the corresponding up-down slope data are locked into the corresponding digital multipliers 304, 305, 306, . . . by the data processor 215 at proper timing by using the method of time division multiplexing based on the received respective carrier power data and the respective carrier frequency information 214, and an enable is outputted finally to allow the data obtained by multiplying the respective carrier signals to be simultaneously transferred to the adder 210 to be accumulated.

Figure 4:
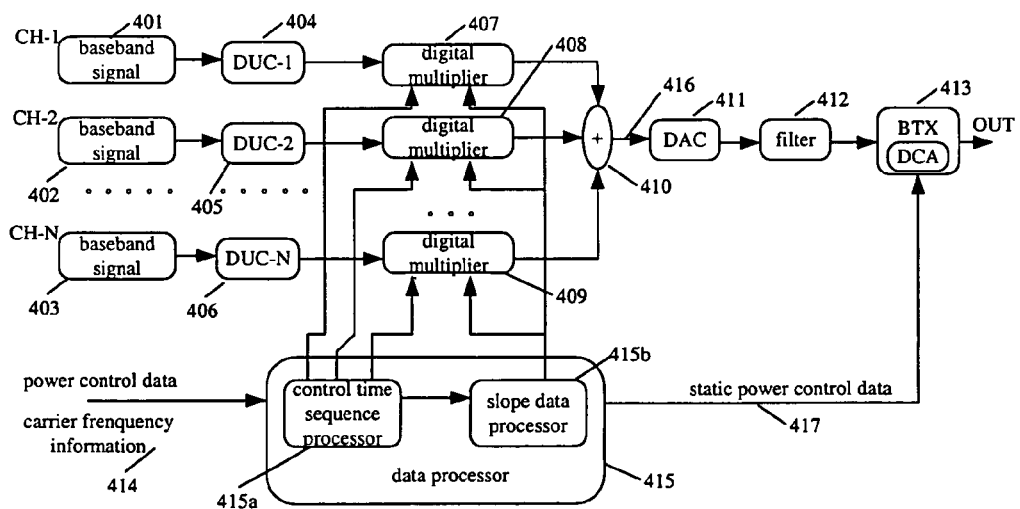
FIG. 4 is a structure schematic diagram showing the second embodiment of the multi-carrier power control apparatus according to the present invention.

Another possible multi-carrier power control apparatus according to the invention is shown in FIG. 4. A multi-carrier power control apparatus for base station in a broadband digital mobile communication system according to the embodiment comprises: N digital up-conversion processors 416, a data processor 415, an adder 410, a digital to analog converter 411, a filter 412 and a transmitter 413 with a numerical controlled attenuator. Unlike the embodiment shown in FIG. 2, the apparatus according to the present embodiment further comprises N digital multipliers 407, 408, 409, . . . . The input terminals of N digital multipliers 407, 408, 409, . . . are respectively connected to the output terminals of the N digital up-conversion processors 404, 405, 406, . . . , and the output signals are connected to the adder 408.

N-way baseband signals 401, 402, 403, . . . are respectively inputted to the corresponding N digital up-conversion processors 404, 405, 406, . . . , and outputted from them to the N digital multipliers 407, 408, 409, . . . . At the same time, the power control data and the carrier frequency information 414 are sent to the data processor 415 that comprises a control time sequence processor 415a and a slope data processor 415b. The power control data and the carrier frequency information are sent to the control time sequence processor 415a of the data processor. The signals outputted from the control time sequence processor 415a are divided into two ways, the signals of one way are sent to N digital multipliers 407, 408, 409, . . . , and the signals of the other way are sent to the slope data processor 415b. The signals outputted from the control time sequence processor 415a to the slope data processor 415b are processed by the slope data processor and also two ways of signals are outputted. The signals of one way are outputted to N digital multipliers 407, 408, 409, . . . , respectively, and the signals of the other way are outputted to the transmitter 413 with a numerical controlled attenuator to be transmitted by the transmitter.

In this embodiment, the static power level control is separated from the dynamic power level control and the up-down slope control, and singly implemented in the analog domain by the numerical controlled attenuator 413. Therefore, total M (M is the number of the dynamic power control levels supported by the base station) up-down slope control curves are required. Furthermore, in fact, the corresponding up-down slope data are locked into the corresponding digital multipliers 407, 408, 409, . . . by the data processor 415 at proper timing by using a method of time division multiplexing based on the received respective carrier power data and the respective carrier frequency information 414, and an enable is outputted finally to allow the data obtained by multiplying the respective carrier signals to be simultaneously transferred to the adder 410 to be accumulated. If the speed for sending the slope data to the digital multipliers 407, 408, 409, . . . is too low, the strays will be introduced, so a certain speed is required for sending the slope data. Sending the slope data with high speed can be realized through outputting directly from RAM or using an interpolation filtering method, the digital multipliers 407, 408, 409, . . . with high speed can be made by using dedicated chips or FPGAs. The digital up-conversion processors 404, 405, 406, . . . are universal digital up-conversion processors.

The open-loop power control according to the present embodiment comprises the steps as follows.

In the first step, the power control data and the carrier frequency information are received by the data processor 415, so as to the dynamic control data, the up-down slope control data and the corresponding static control data 417 for each carrier frequency can be generated.

In the second step, the generated dynamic control data and the up-down slope control data for each carrier frequency are transferred from the data processor 415 to the corresponding multiplier modules 407, 408, 409, . . . , and the dynamic power level control and the slope power control are implemented by the multiplier modules 407, 408, 409, . . . .

In the third step, the multi-way synthesized multi-carrier signal 416 is obtained in the adder 410 through summing the signals outputted from the multiplier modules 407, 408, 409, . . . .

In the fourth step, after the multi-carrier signal 416 is sent to the numerical controlled attenuator 413 through the DAC module 411 and the filter module 412, the static power control is implemented in the numerical controlled attenuator 413, wherein, the static power level data 417 are generated by the data processor 415 and transferred to the numerical controlled attenuator 413.

The power control method according to the invention has the following features.

1. The dynamic power control and the up-down slope control are implemented for each carrier before multi-way synthesizing, and the slope curves with different levels can be set based on the practical requirement, the transition of the up-down slope curves is smooth during the power level switching process.

2. The static power level control not only can be implemented together with the dynamic power level control and the up-down slope control in the digital domain, but also can be implemented in the radio frequency domain by the numerical controlled attenuator.

3. The power control for the respective carriers is independent of each other, so that the transmitting power of any carrier at any time slot can be varied flexibly and easily with the invention.

4. The up-down slope power control is implemented by the digital multiplier under the control of the data processor; the problem of non-linearity does not exist in the digital multiplier, so the control accuracy is rather high.

5. The linearity requirement of the broadband transmitting channel can be decreased through performing a method for pre-distortion processing the up-down slope curves in advance.

INDUSTRIAL APPLICABILITY

The present invention employs the above-mentioned technical scheme in which the multi-carrier open-loop power control is used and the power control for respective carriers is implemented before synthesizing multi-way digital intermediate frequency signals. The advantages of the method are as follows.

1. The power control for a plurality of carriers can be simultaneously implemented and the requirement of the time domain template and the frequency domain template can be simultaneously satisfied.

2. The power control for the respective carriers is manly implemented before multi-way synthesizing, the dynamic power control and the up-down slope control for the respective carriers are independent of each other. The static power control not only can be implemented for the respective carriers together with the dynamic power control, but also can be singly implemented in the radio frequency portion. This power control method is capable of varying the transmitting power of any carrier at any time slot flexibly and easily.

3. The different power control curves are respectively used for the respective carriers at different power levels, and the dynamic power control is implemented in the digital domain.

4. The dynamic power control and the up-down slope control are implemented firstly for the respective carriers, and then multi-way synthesizing is performed.

5. The different dynamic power levels correspond to different up-down slope power control curves, the transition of the up-down slope curve is smooth during power level switching process.

The invention claimed is:

1. A multi-carrier power control apparatus for base station in a broadband digital mobile communication system, comprising: N digital up-conversion processors, a data processor, an adder, a digital to analog converter, a filter and a transmitter with a numerical controlled attenuator; wherein N-way baseband signals are respectively inputted to the N digital up-conversion processors, meanwhile, the power control data and the carrier frequency information are sent to the data processor and processed by the data processor, and then the dynamic power level data are respectively outputted from the data processor to N digital up-conversion processors, and the data outputted from N digital up-conversion processors are transferred to the adder, the synthesized data are sent in turn to the digital to analog converter, the filter and the transmitter with a numerical controlled attenuator, meanwhile, the up-down slope control data are also outputted from the data processor to the transmitter with a numerical controlled attenuator to be transmitted by the transmitter.

2. The apparatus of claim 1, wherein said data processor comprises a control time sequence processor and a slope data processor; the power control data and the carrier frequency information are sent to the control time sequence processor of the data processor, the signals are outputted from the control time sequence processor through two ways, the signals of one way are sent to N digital up-conversion processors, and the signals of the other way are sent to the slope data processor, after being processed by the slope data processor, also two ways of signals are outputted, the signals of one way are outputted respectively to N digital up-conversion processors, and the signals of the other way are outputted to the transmitter with a numerical controlled attenuator to be transmitted by the transmitter.

3. The apparatus of claim 2, wherein each of said up-conversion processors comprises a modulator, a digital multiplier, a filter module, an interpolation filter and a numerical controlled oscillator that are connected in sequence; the power control data and the carrier frequency information are sent to the control time sequence processor of the data processor, the signals are outputted from the control time sequence processor through two ways, the signals of one way are sent to N digital multipliers, and the signals of the other way are sent to the slope data processor, the signals processed by the slope data processor are respectively outputted to N digital multipliers.

4. The apparatus of claim 1, further comprising N digital multipliers, wherein the input terminals of said N digital multipliers are respectively connected to the output terminals of the corresponding N digital up-conversion processors, and the output signals from the N digital multipliers are transferred to the adder, the synthesized data are transferred in turn to the digital to analog converter, the filter and the transmitter with a numerical controlled attenuator; two ways of signals are outputted from the data processor, the signals of one way are sent to N digital multipliers, and the static power control data are outputted through the other way to the numerical controlled attenuator of the transmitter.

5. The apparatus of claim 4, wherein said data processor comprises a control time sequence processor and a slope data processor; the power control data and the carrier frequency information are sent to the control time sequence processor of the data processor, the signals are outputted from the control time sequence processor through two ways, the signals of one way are sent to N digital multipliers, and the signals of the other way are sent to the slope data processor, after being processed by the slope data processor, also two ways of signals are outputted, the signals of one way are outputted respectively to N digital multipliers, and the static power control data are outputted through the other way to the transmitter with a numerical controlled attenuator to be transmitted by the transmitter.

6. A multi-carrier power control method for base station in a broadband digital mobile communication system by using the apparatus as claim 1, the method employing an open-loop control method and implementing the power control for each carrier before multi-way synthesizing, said method comprising the steps of:

(1) the data processor receiving power control data and information of respective carrier frequencies, and generating dynamic control data, static control data and corresponding up-down slope control data corresponding to the respective carrier frequencies;

(2) the data processor sending the dynamic control data and the up-down slope control data corresponding to the respective carrier frequencies to the corresponding digital frequency converter to implement the dynamic power level control and the static power control;

(3) generating a multi-way synthesized multi-carrier signal through summing the signals outputted from the digital frequency converters, and sending the multi-carrier signal to the numerical controlled attenuator after filtering and digital to analog converting; and (4) the numerical controlled attenuator implementing the power control for the filtered multi-carrier signal based on the digital to analog converted control data.

7. The method of claim 6, wherein the slope curves of different levels for the power control of the respective carriers are set based on the practical requirement, the method further comprising: determining one power control slope curve firstly; calculating the power control slope curve data of the respective power levels based on different power levels; and storing the power slope data of all levels into the data processor.

8. The method of claim 6, wherein said static power level control is implemented in the digital domain together with the dynamic power level control and the up-down slope control, or implemented in the radio frequency domain by the numerical controlled attenuator.

9. The method of claim 8, wherein said static power level control is implemented in the digital domain together with the dynamic power level control and the up-down slope control is: the static power level data, the dynamic power level control data and the up-down slope control data are directly transferred together from the data processor to the respective digital up-converters to implement the power control.

10. The method of claim 8, wherein said static power level control is implemented in the radio frequency domain by the numerical controlled attenuator is: the static power level data are transferred from the data processor to the numerical controlled attenuator to implement the static power control in the radio frequency domain.

11. The method of claim 6, wherein the static power control and the dynamic power control are implemented together when the dynamic range of the digital to analog converter is large enough, and the static power control is implemented in the radio frequency domain when the dynamic range of the digital to analog converter is limited.

12. The method of claim 6, wherein the up-down slope data of the respective carriers are multiplexed, the method further comprising: the data processor locking the corresponding up-down slope data into the corresponding digital multipliers at proper timing by using the method of time division multiplexing based on the received respective carrier power data and the respective carrier frequency information; and simultaneously sending the multiplied data of the respective carrier to the adder to sum up through outputting an enable.

* * * * *